(12) United States Patent
Müller et al.

(10) Patent No.: US 9,309,356 B2
(45) Date of Patent: *Apr. 12, 2016

(54) METHOD FOR ACTIVATING DOUBLE METAL CYANIDE CATALYSTS FOR THE PRODUCTION OF POLYETHER CARBONATE POLYOLS

(75) Inventors: Thomas Ernst Müller, Aachen (DE); Christoph Gürtler, Köln (DE); Yvonne Dienes, Hannover (DE); Julien Barruet, Fresnes (FR); Burkhard Köhler, Zierenberg (DE); Walter Leitner, Aachen (DE)

(73) Assignee: Bayer Intellectual Property GmbH, Leverkusen (DE)

( * ) Notice: Subject to any disclaimer, the term of this patent is extended or adjusted under 35 U.S.C. 154(b) by 115 days.

This patent is subject to a terminal disclaimer.

(21) Appl. No.: 14/232,633

(22) PCT Filed: Jul. 16, 2012

(86) PCT No.: PCT/EP2012/063902
§ 371 (c)(1),
(2), (4) Date: Mar. 18, 2014

(87) PCT Pub. No.: WO2013/010987
PCT Pub. Date: Jan. 24, 2013

(65) Prior Publication Data
US 2014/0221602 A1    Aug. 7, 2014

(30) Foreign Application Priority Data
Jul. 18, 2011   (EP) .................................... 11174402

(51) Int. Cl.
*C08G 64/32* (2006.01)
*C08G 64/34* (2006.01)
*C08G 65/26* (2006.01)
*C08G 64/00* (2006.01)
*C08G 64/04* (2006.01)

(52) U.S. Cl.
CPC .............. *C08G 64/323* (2013.01); *C08G 64/34* (2013.01); *C08G 65/2603* (2013.01); *C08G 65/2663* (2013.01)

(58) Field of Classification Search
CPC ....................................................... C08G 64/32
USPC ........... 528/405, 371, 408, 412, 414; 558/266
See application file for complete search history.

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 5,158,922 A | 10/1992 | Hinney et al. | |
| 5,470,813 A | 11/1995 | Le-Khac | |
| 5,482,908 A | 1/1996 | Le-Khac | |
| 5,844,070 A | 12/1998 | Hayes et al. | |
| 6,780,813 B1 | 8/2004 | Hofmann et al. | |
| 7,008,900 B1 | 3/2006 | Hofmann et al. | |
| 2003/0204042 A1 | 10/2003 | Moethrath et al. | |
| 2005/0159627 A1 | 7/2005 | Stosser et al. | |
| 2009/0306239 A1 | 12/2009 | Mijolovic et al. | |
| 2010/0048935 A1 | 2/2010 | Mijolovic et al. | |

FOREIGN PATENT DOCUMENTS

| | | | |
|---|---|---|---|
| DE | WO2011/089210 | * | 7/2011 |
| EP | 0 222 453 A2 | | 5/1987 |
| EP | 0700949 A2 | | 3/1996 |
| EP | 0743093 A1 | | 11/1996 |
| EP | 0761708 A2 | | 3/1997 |
| EP | 0981407 A1 | | 3/2000 |
| EP | 1359177 A1 | | 11/2003 |
| EP | 1474464 A1 | | 11/2004 |
| JP | 4145123 B2 | | 9/2008 |
| WO | WO-97/40086 A1 | | 10/1997 |
| WO | WO-98/16310 A1 | | 4/1998 |

(Continued)

OTHER PUBLICATIONS

International Search Report for PCT/EP2012/063902 mailed Sep. 6, 2012.

*Primary Examiner* — Duc Truong
(74) *Attorney, Agent, or Firm* — Drinker Biddle & Reath LLP

(57) ABSTRACT

The present invention relates to a process for the activation of double metal cyanide (DMC) catalysts with heterocumulenes for the preparation of polyether carbonate polyols by catalytic copolymerization of carbon dioxide ($CO_2$) with alkylene oxides in the presence of one or more H-functional starter substances, and to a process for the preparation of polyether carbonate polyols from one or more H-functional starter substances, one or more alkylene oxides and carbon dioxide in the presence of a double metal cyanide catalyst, characterized in that ($\alpha$) under an inert gas atmosphere, under an atmosphere of an inert gas/carbon dioxide mixture or under a pure carbon dioxide atmosphere, at temperatures of from 90 to 150° C., the DMC catalyst is mixed with a heterocumulene and H-functional starter substance, ($\beta$) alkylene oxide is added at temperatures of from 100 to 150° C. to the mixture from step ($\alpha$) under an inert gas atmosphere, under an atmosphere of an inert gas/carbon dioxide mixture or under a pure carbon dioxide atmosphere, and ($\gamma$) one or more alkylene oxides and carbon dioxide are metered continuously into the mixture resulting from step ($\beta$).

15 Claims, No Drawings

(56) References Cited

FOREIGN PATENT DOCUMENTS

| WO | WO-98/52689 A1 | 11/1998 |
| WO | WO-00/47649 A1 | 8/2000 |
| WO | WO-01/39883 A1 | 6/2001 |
| WO | WO-03/029325 A1 | 4/2003 |
| WO | WO-03/066706 A1 | 8/2003 |
| WO | WO-2006/103214 A1 | 10/2006 |
| WO | WO-2008/058913 A1 | 5/2008 |
| WO | WO-2008092767 A1 | 8/2008 |

* cited by examiner

METHOD FOR ACTIVATING DOUBLE METAL CYANIDE CATALYSTS FOR THE PRODUCTION OF POLYETHER CARBONATE POLYOLS

RELATED APPLICATIONS

This application is a national stage application (under 35 U.S.C. §371) of PCT/EP2012/063902, filed Jul. 16, 2012, which claims benefit of European Application No. 11174402.5, filed Jul. 18, 2011, which is incorporated by reference herein.

The present invention relates to a process for the activation of double metal cyanide (DMC) catalysts with heterocumulenes for the preparation of polyether carbonate polyols by catalytic copolymerization of carbon dioxide ($CO_2$) with alkylene oxides in the presence of one or more H-functional starter substances.

The preparation of polyether carbonate polyols by catalytic reaction of alkylene oxides (epoxides) and carbon dioxide in the presence or absence of H-functional starter substances (starters) has been investigated intensively for more than 40 years (e.g. Inoue et al., Copolymerization of Carbon Dioxide and Epoxide with Organometallic Compounds; Die Makromolekulare Chemie 130, 210-220, 1969). This reaction e.g. using an H-functional starter substance is shown in diagram form in equation (I), wherein R represents an organic radical, such as alkyl, alkylaryl or aryl, each of which can also contain hetero atoms, such as, for example, O, S, Si etc., and wherein e and f represent an integer, and wherein the product shown here for the polyether carbonate polyol in equation (I) is merely to be understood as meaning that blocks with the structure shown can in principle be found in the polyether carbonate polyol obtained, but the sequence, number and length of the blocks and the OH functionality of the starter can vary and is not limited to the polyether carbonate polyol shown in equation (I). This reaction (see equation (I)) is ecologically very advantageous, since this reaction represents the conversion of a greenhouse gas, such as $CO_2$, into a polymer. The cyclic carbonate (for example for R=$CH_3$ propylene carbonate) shown in formula (I) is formed as a further product, actually a by-product.

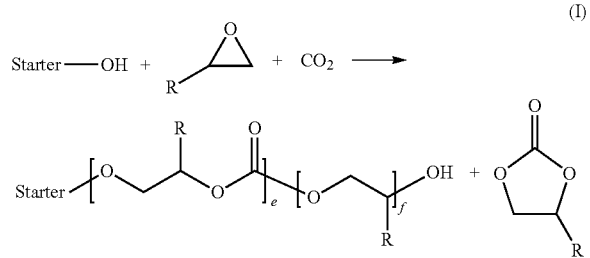

(I)

A step in which a part amount of alkylene oxide compound, optionally in the presence of $CO_2$, is added to the DMC catalyst and the addition of the alkylene oxide compound is then interrupted, due to a subsequent exothermic chemical reaction an evolution of heat which can lead to a temperature peak ("hot spot"), and due to the reaction of alkylene oxide and optionally $CO_2$ a drop in pressure in the reactor, being observed, is called an activation in the context of this invention. The process step of activation is the time span from the addition of the part amount of alkylene oxide compound, optionally in the presence of $CO_2$, to the DMC catalyst up to the occurrence of the evolution of heat. In general, the activation step can be preceded by a step for drying the DMC catalyst and, where appropriate, the starter at elevated temperature and/or under reduced pressure, where appropriate while passing an inert gas through the reaction mixture The activation of a DMC catalyst for the purpose of homopolymerization of alkylene oxides (i.e. in the absence of carbon dioxide) is known. EP-A 0 981 407 discloses the activation of a DMC catalyst for the purpose of alkylene oxide polymerization. The heating of a mixture of catalyst and starter in vacuo is thus extended in that inert gas simultaneously flows through the mixture or in that the heating of a mixture of catalyst and starter is carried out in vacuo in the presence of an organic solvent. This leads to a faster activation of the catalyst and to an increased product quality. A disadvantage is that the use of a solvent leads to increased costs (material costs for the solvent and an additional process step for removal of the solvent from the product) and that the space/time yield is reduced. The use in the copolymerization of carbon dioxide ($CO_2$) with alkylene oxides in the presence of an H-functional compound is not disclosed in EP-A 0 981 407.

EP-A 1474464 discloses a reduction in the induction time for activation of the catalyst in order to prepare polyethers, which is achieved in that an alkylene oxide is added to a mixture of DMC catalyst and starter under an internal reactor pressure of less than 1 bar. The use in the copolymerization of carbon dioxide ($CO_2$) with alkylene oxides in the presence of an H-functional compound is not disclosed in EP-A 0 981 407.

EP-A 0 222 453 discloses a process for the preparation of polycarbonates from alkylene oxides and carbon dioxide using a catalyst system of DMC catalyst and a co-catalyst, such as zinc sulfate. In this process, the polymerization is initiated by bringing uniquely a part of the alkylene oxide into contact with the catalyst system. Only thereafter are the remaining amount of alkylene oxide and the carbon dioxide metered in simultaneously. The amount of 60 wt. % of alkylene oxide compound stated in Examples 1 to 7 of EP-A 0 222 453 is high relative to the starter and has the disadvantage that this represents a certain safety risk for large-scale industrial uses because of the high exothermicity of the homopolymerization of alkylene oxide compounds.

WO-A 2003/029325 (BASF) discloses a process for the preparation of high molecular weight aliphatic polyether carbonate polyols (weight-average molecular weight greater than 30,000 g/mol), in which a catalyst from the group consisting of zinc carboxylate and multimetal cyanide compound which is anhydrous is employed and is first brought into contact with at least a part amount of the carbon dioxide, before the alkylene oxide is added. $CO_2$ final pressures of up to 150 bar impose very high requirements on the reactor and on safety. Even by the extremely high pressure of 150 bar, only approx. 33 wt. % of $CO_2$ to a maximum of 42 wt. % of $CO_2$ was incorporated. The examples presented describe the use of a solvent (toluene), which must be separated off again by means of heat after the reaction, which leads to an increased time and cost outlay. Furthermore, the polymers, with an inhomogeneity or polydispersity of 2.7 or more, have a very broad molecular weight distribution.

There is accordingly the need for an improved activation of DMC catalysts which does not have the disadvantages of the prior art, such as, in particular, the reduced catalyst activity in the presence of $CO_2$, or the time-consuming activation or "uncontrolled" activation of the catalyst under $CO_2$ during the continuous addition of alkylene oxides. The catalysts activated in this way should have a high activity and lead to a highest possible content of CO$_2$ in the polymer. The amount of cyclic carbonate formed should be as low as possible.

It was therefore the object of the present invention to provide a process for the preparation of polyether carbonate polyols which both leads to a high content of incorporated CO$_2$ and at the same time has the effect of a favourable selectivity (i.e. low ratio of cyclic carbonate to linear polyether carbonate) of the resulting polyether carbonate polyol.

Surprisingly, it has been found that the object according to the invention is achieved by a process for the preparation of polyether carbonate polyols from one or more H-functional starter substances, one or more alkylene oxides and carbon dioxide in the presence of a DMC catalyst, characterized in that the DMC catalyst is activated in the presence of one or more heterocumulenes. The invention also provides the activation of DMC catalysts, wherein the DMC catalyst is activated in the presence of a heterocumulene and optionally an H-functional substance.

The invention thus provides a process for the preparation of polyether carbonate polyols from one or more H-functional starter substances, one or more alkylene oxides and carbon dioxide in the presence of a DMC catalyst, characterized in that ($\alpha$) under an inert gas atmosphere (for example argon or nitrogen), under an atmosphere of an inert gas/carbon dioxide mixture or under a pure carbon dioxide atmosphere, at temperatures of from 90 to 150° C., preferably from 125 to 135° C., the DMC catalyst is mixed with a heterocumulene and H-functional starter substance, ($\beta$) alkylene oxide is added at temperatures of from 90 to 150° C., preferably from 125 to 135° C., to the mixture from step ($\alpha$) under an inert gas atmosphere (for example argon or nitrogen), under an atmosphere of an inert gas/carbon dioxide mixture or under a pure carbon dioxide atmosphere, and ($\gamma$) one or more alkylene oxides and carbon dioxide are metered continuously into the mixture resulting from step ($\beta$) ("copolymerization"). The alkylene oxides employed for the copolymerization can be identical to or different from the alkylene oxides employed in the activation.

In a preferred embodiment, the amount of one or more alkylene oxides employed in the activation in step ($\beta$) is 0.1 to 25.0 wt. %, preferably 1.0 to 20.0 wt. %, particularly preferably 5 to 16.0 wt. % (based on the amount of starter substance employed in step ($\alpha$)). The alkylene oxide can be added in one step or stepwise in several part amounts. The heterocumulene in step ($\alpha$) is preferably employed in a weight ratio of DMC catalyst to heterocumulene of from 1:150 to 10:1, particularly preferably 1:100 to 1:1. The DMC catalyst is preferably employed in an amount such that the content of DMC catalyst in the resulting polyether carbonate polyol is 10 to 10,000 ppm, particularly preferably 20 to 5,000 ppm and most preferably 50 to 500 ppm.

The invention thus also provides a process for the activation of DMC catalysts, characterized in that ($\alpha$) under an inert gas atmosphere (for example argon or nitrogen), under an atmosphere of an inert gas/carbon dioxide mixture or under a pure carbon dioxide atmosphere, at temperatures of from 90 to 150° C., preferably from 125 to 135° C., the DMC catalyst is mixed with a heterocumulene and H-functional starter substance, and subsequently ($\beta$) alkylene oxide is added at temperatures of from 90 to 150° C., preferably from 125 to 135° C., to the mixture from step ($\alpha$) under an inert gas atmosphere (for example argon or nitrogen), under an atmosphere of an inert gas/carbon dioxide mixture or under a pure carbon dioxide atmosphere.

Step ($\alpha$):

The addition of the individual components in step ($\alpha$) can be carried out simultaneously or successively in any desired sequence; preferably, in step ($\alpha$) the DMC catalyst is first mixed with a heterocumulene under an inert gas atmosphere (for example argon or nitrogen), under an atmosphere of an inert gas/carbon dioxide mixture or under a pure carbon dioxide atmosphere, at temperatures of from 90 to 150° C., preferably from 125 to 135° C., and the H-functional starter substance is then added. Alternatively, under an inert gas atmosphere (for example argon, nitrogen and/or carbon dioxide), the DMC catalyst can be mixed with a heterocumulene and H-functional starter substance and the mixture can be heated up to temperatures of from 90 to 150° C., preferably from 125 to 135° C.

In a particularly preferred embodiment, an inert gas (for example argon or nitrogen), an inert gas/carbon dioxide mixture or carbon dioxide is passed into the resulting mixture at a temperature of from 90 to 150° C., and at the same time a reduced pressure (absolute) of from 10 mbar to 800 mbar, particularly preferably from 50 mbar to 200 mbar, is applied.

In a further preferred embodiment, in step ($\alpha$)

($\alpha$1) the H-functional starter substance or a mixture of at least two H-functional starter substances is initially introduced into the reaction vessel and ($\alpha$2) the temperature of the starter substance or of the mixture is brought to 50 to 200° C., preferably 80 to 160° C., particularly preferably 100 to 140° C., and/or the pressure in the reactor is lowered to less than 500 mbar, preferably 5 mbar to 100 mbar, an inert gas stream (for example of argon or nitrogen), an inert gas/carbon dioxide stream or a carbon dioxide stream optionally being passed through the reactor, the double metal cyanide catalyst and heterocumulene being added to the H-functional starter substance or the mixture of at least two H-functional starter substances in step ($\alpha$1) or immediately subsequently in step ($\alpha$2).

The DMC catalyst can be added in the solid form or as a suspension in an H-functional starter substance. If the catalyst is added as a suspension, this is preferably added to the H-functional starter substance(s) in step ($\alpha$1).

In an alternative embodiment, the resulting mixture is charged, at a temperature of from 100° C. to 130° C., at least once, preferably three times, with 1.5 bar to 10 bar (absolute), particularly preferably 3 bar to 6 bar (absolute), of an inert gas (for example argon or nitrogen), an inert gas/carbon dioxide mixture or carbon dioxide and each time the increased pressure is subsequently reduced to approx. 1 bar (absolute).

Step ($\beta$):

The metering of one or more alkylene oxides and of the carbon dioxide can in principle be carried out in various ways. The start of the metering can take place from the vacuum or under a previously selected prepressure. The prepressure is preferably established by passing in an inert gas (such as, for example, nitrogen or argon) or carbon dioxide, the pressure (absolute) being 10 mbar to 100 bar, preferably 100 mbar to 50 bar and preferably 500 mbar to 50 bar.

Step ($\gamma$):

The metering of one or more alkylene oxides and of the carbon dioxide can be carried out simultaneously or sequentially, it being possible for the total amount of carbon dioxide to be added all at once or by metering over the reaction time. It is possible to increase or to lower, gradually or stepwise, or to leave constant the CO$_2$ pressure during the addition of the alkylene oxide. Preferably, the overall pressure is kept constant during the reaction by topping up with carbon dioxide. The metering of one or more alkylene oxides is carried out simultaneously with or sequentially to the carbon dioxide metering. It is possible to meter the alkylene oxide with a constant metering rate or to increase or to lower the metering rate gradually or stepwise or to add the alkylene oxide in portions. Preferably, the alkylene oxide is added to the reaction mixture with a constant metering rate. If several alkylene oxides are employed for the synthesis of the polyether carbonate polyols, the alkylene oxides can be metered in individually or as a mixture. The metering of the alkylene oxides can be carried out simultaneously or sequentially via in each case separate meterings (additions), or via one or more meterings, it being possible for the alkylene oxides to be metered in individually or as a mixture. Via the nature and/or the sequence of the metering of the alkylene oxides and/or of the carbon dioxide, it is possible to synthesize random, alternating, block-like or gradient-like polyether carbonate polyols.

Preferably, an excess of carbon dioxide, based on the calculated amount of carbon dioxide incorporated in the polyether carbonate polyol, is employed, since due to the slowness of carbon dioxide to react an excess of carbon dioxide is advantageous. The amount of carbon dioxide can be determined via the overall pressure under the particular reaction conditions. The range of from 0.01 to 120 bar, preferably 0.1 to 110 bar, particularly preferably from 1 to 100 bar has proved to be advantageous as the overall pressure (absolute) for the copolymerization for the preparation of the polyether carbonate polyols. It is possible to feed in the carbon dioxide continuously or discontinuously. This depends on how rapidly the alkylene oxides are consumed, and on whether the product is optionally to contain $CO_2$-free polyether blocks. The amount of carbon dioxide (stated as the pressure) can equally be varied during the addition of the alkylene oxides. $CO_2$ can also be added to the reactor as a solid and can then pass into the gaseous, dissolved, liquid and/or supercritical state under the reaction conditions chosen.

It has furthermore been found for the process according to the invention that the copolymerization (step ($\gamma$)) for the preparation of the polyether carbonate polyols is advantageously carried out at 50 to 150° C., preferably at 60 to 145° C., particularly preferably at 70 to 140° C. and very particularly preferably at 90 to 130° C. If temperatures below 50° C. are established, the reaction almost ceases. At temperatures above 150° C. the amount of undesirable by-products increases greatly.

The three steps $\alpha$, $\beta$ and $\gamma$ can be carried out in the same reactor or in each case separately in different reactors. Particularly preferred reactor types are: tube reactors, stirred tanks, loop reactors.

Polyether carbonate polyols can be prepared in a stirred tank, the stirred tank being cooled via the reactor jacket, internal cooling surfaces and/or cooling surfaces in a pumped circulation, depending on the embodiment and mode of operation. Both in the semi-batch use, in which the product is removed only after the end of the reaction, and in the continuous use, in which the product is removed continuously, attention is to be paid in particular to the metering rate of the alkylene oxide. It is to be adjusted such that in spite of the inhibiting action of the carbon dioxide, the alkylene oxides react sufficiently rapidly. The concentration of free alkylene oxides in the reaction mixture during the activation step (step $\beta$) is preferably >0 to 100 wt. %, particularly preferably >0 to 50 wt. %, most preferably >0 to 20 wt. % (in each case based on the weight of the reaction mixture). The concentration of free alkylene oxides in the reaction mixture during the reaction (step $\gamma$) is preferably >0 to 40 wt. %, particularly preferably >0 to 25 wt. %, most preferably >0 to 15 wt. % (in each case based on the weight of the reaction mixture).

A further possible embodiment in the stirred tank for the copolymerization (step $\gamma$) is characterized in that one or more H-functional starter substances are metered continuously into the reactor during the reaction. The amount of H-functional starter substances which are metered continuously into the reactor during the reaction is preferably at least 20 equivalent mol %, particularly preferably 70 to 95 equivalent mol % (in each case based on the total amount of H-functional starter substances).

In a preferred embodiment, the catalyst/starter mixture activated according to steps $\alpha$ and $\beta$ are reacted further with alkylene oxides and carbon dioxide in the same reactor. In a further preferred embodiment, the catalyst/starter mixture activated according to steps $\alpha$ and $\beta$ is reacted further with alkylene oxides and carbon dioxide in a different reaction container (for example a stirred tank, tube reactor or loop reactor).

If the reaction is carried out in a tube reactor, the activated catalyst/starter mixture and where appropriate further starter as well as alkylene oxides and carbon dioxide are pumped continuously through a tube. The molar ratios of the reaction partners vary according to the desired polymer. In a preferred embodiment, carbon dioxide is metered in here in its liquid or supercritical form, in order to render possible an optimum miscibility of the components. For better thorough mixing of the reaction partners, mixing elements such as are marketed, for example, by Ehrfeld Mikrotechnik BTS GmbH, or mixer-heat exchanger elements which simultaneously improve the mixing and removal of heat are advantageously installed.

Loop reactors can equally be used for the preparation of polyether carbonate polyols. These include in general reactors with recycling of substances, such as, for example, a jet loop reactor, which can also be operated continuously, or a tube reactor configured in loop form with suitable devices for circulating the reaction mixture or a loop of several tube reactors connected in series. The use of a loop reactor is advantageous in particular because backmixing can be realized here, so that the concentration of free alkylene oxides in the reaction mixture can be kept in the optimum range, preferably in the range of >0 to 40 wt. %, particularly preferably >0 to 25 wt. %, most preferably >0 to 15 wt. % (in each case based on the weight of the reaction mixture).

In order to realize complete conversion, downstream of the reaction apparatus in which step $\gamma$ is carried out a further tank or a tube ("dwell tube") is often connected, in which residual concentrations of free alkylene oxides present after the reaction react. Preferably, the pressure in this downstream reactor is at the same pressure as in the reaction apparatus in which reaction step $\gamma$ is carried out. However, the pressure chosen in the downstream reactor can also be higher or lower. In a further preferred embodiment, after reaction step $\gamma$ all or some of the carbon dioxide is let down and the downstream reactor is operated under normal pressure or a slight increased pressure. The temperature in the downstream reactor is preferably 10 to 150° C., and particularly preferably 20 to 120° C.

The polyether carbonate polyols obtained according to the invention have a functionality of at least 1, preferably of from 1 to 8, particularly preferably from 1 to 6 and very particularly preferably from 2 to 4. The molecular weight is preferably 400 to 10,000 g/mol and particularly preferably 500 to 6,000 g/mol.

Compounds which contain at least one functional group chosen from the group consisting of the isocyanate group (i.e. compounds containing at least one O═C═N— group), isothiocyanate group (i.e. compounds containing at least one S═C═N— group), carbodiimides (i.e. compounds containing at least one —N═C═N— group), ketene group (i.e.

compounds containing at least one O=C=C< group), thioketene group (i.e. compounds containing at least one S=C=C< group) are employed as heterocumulenes. In this context, the isocyanate group, the isothiocyanate group, the carbodiimide group, ketene group and/or thioketene group can also be part of an oligomer or polymer. For example, polycarbodiimide can be employed as the heterocumulene.

Isocyanates of the formula (II)

$R^1$—(—X—N=C=O)$_n$ (II)

wherein $R^1$ represents an n-valent aliphatic, aromatic or araliphatic radical having 1 to 36 carbon atoms,
n represents a natural number from 1 to 6 and
X represents a chemical bond (single bond), an —SO$_2$— or a —CO— group
are particularly preferred.

Examples of compounds of the formula (II) are tosyl isocyanate, benzoyl isocyanate, acetyl isocyanate, carbonyl-diisocyanate, sulfonyl-diisocyanate, benzenesulfonyl isocyanate, methansulfonyl-diisocyanate, o-, m- and p-phthaloyl-diisocyanate, 4,4',4"-triisocyanatophenylmethane, 4,4'-methylene-diisocyanate, 2,4'-methylene-diisocyanate, 2,2'-methylene-diisocyanate, 2,4-toluoylene-diisocyanate, 2,6-toluoylene-diisocyanate, m- and p-phenylene-diisocyanate, diphenyl-diisocyanate, 3,3'-dimethyl-4,4'-diisocyanato-diphenyl, 3,4'-diisocyanatodiphenyl ether, 4,4'-diisocyanato-diphenyl ether, m- and p-bisisocyanatomethylbenzene, 1,3- and 1,4-bisisocyanatomethylcyclohexane, 1,3-bis-(1-isocyanato-1-methylethyl)benzene, 1,6-hexamethylene-diisocyanate (HDI), 2,2,4-trimethyl-1,6-hexamethylene-diisocyanate, isophorone-diisocyanate (IPDI), m-tetramethylxylene-diisocyanate (m-TMXDI), bisisocyanatomethylnorbornane, phenyl isocyanate, butyl isocyanate and methyl isocyanate and mixtures of these substances.

Compounds which are likewise preferably employed as heterocumulenes in the process according to the invention are those of the formula (IIIa) and (IIIb)

$R^2$—N=C=N—$R^3$ (IIIa)

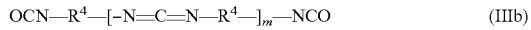

OCN—$R^4$—[-N=C=N—$R^4$—]$_m$—NCO (IIIb)

wherein
$R^2$ and $R^3$ represent a C1 to C22 alkyl, a C6-C18 aryl or a C7-C22 aralkyl radical,
$R^4$ represents a divalent C6-C36 aliphatic, aromatic or araliphatic radical and
m represents a natural number from 3 to 300, preferably from 5 to 50.

Examples of compounds of the formula (IIIa) are dicyclohexylcarbodiimide, di-p-toluoylcarbodiimide, di-tert-butyl-carbodiimide, diisopropylcarbodiimide, tert-butylethylcarbodiimide or 3-dimethylaminopropylethylcarbodiimide and the particular reaction product thereof with methiodide or methotosylate. The carbodiimide group itself can also be quaternized with alkylating reagents, such as methyl iodide, methyl tosylate, benzyl bromide or dimethyl sulfate. Examples of compounds of the formula (IIIb) are polycarbodiimides, which are obtainable, for example, from the polymerization of diisocyanates (such as, for example, 4,4'-methylene-diisocyanate, 2,4'-methylene-diisocyanate, 2,2'-methylene-diisocyanate, 2,4-toluoylene-diisocyanate, 2,6-toluoylene-diisocyanate, IPDI and m-TMXDI) in the presence of cyclic phosphine oxides as a polymerization catalyst.

Generally, alkylene oxides (epoxides) having 2-24 carbon atoms can be employed for the process according to the invention. The alkylene oxides having 2-24 carbon atoms are, for example, one or more compounds chosen from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, such as, for example, methyl glycidyl ether, ethyl glycidyl ether, 2-ethylhexyl glycidyl ether, allyl glycidyl ether, glycidyl methacrylate and epoxide-functional alkyloxysilanes, such as, for example, 3-glycidyloxypropyltrimethoxysilane, 3-glycidyloxypropyltriethoxysilane, 3-glycidyloxy-propyltripropoxysilane, 3-glycidyloxypropylmethyldimethoxysilane, 3-glycidyloxypropyl-ethyldiethoxysilane and 3-glycidyloxypropyltriisopropoxysilane. Preferably, ethylene oxide and/or propylene oxide, in particular propylene oxide, are employed as alkylene oxides.

Compounds with H atoms which are active for the alkoxylation can be employed as a suitable H-functional starter substance. Groups which have active H atoms and are active for the alkoxylation are, for example, —OH, —NH$_2$ (primary amines), —NH— (secondary amines), —SH, and —CO$_2$H, and —OH and —NH$_2$ are preferred and —OH is particularly preferred. The H-functional starter substance employed is, for example, one or more compounds chosen from the group consisting of mono- or polyfunctional alcohols, polyfunctional amines, polyfunctional thiols, amino alcohols thioalcohols, hydroxy esters, polyether polyols, polyester polyols, polyester ether polyols, polyether carbonate polyols, polycarbonate polyols, polycarbonates, polyethyleneimines, polyether-amines (e.g. so-called Jeffamine® from Huntsman, such as e.g. D-230, D-400, D-2000, T-403, T-3000, T-5000 or corresponding products of BASF, such as e.g. Polyetheramin D230, D400, D200, T403, T5000), polytetrahydrofurans (e.g. PolyTHF® of BASF, such as e.g. PolyTHF® 250, 650S, 1000, 1000S, 1400, 1800, 2000), polytetrahydrofuranamines (BASF product Polytetrahydrofuranamin 1700), polyether thiols, polyacrylate polyols, castor oil, the mono- or diglyceride of ricinoleic acid, monoglycerides of fatty acids, chemically modified mono-, di and/or triglycerides of fatty acids, and $C_1$-$C_{24}$-alkyl fatty acid esters which contain on average at least 2OH groups per molecule. By way of example, the $C_1$-$C_{24}$-alkyl fatty acid esters which contain on average at least 2OH groups per molecule are commercial products such as Lupranol Balance® (BASF AG), Merginol® types (Hobum Oleochemicals GmbH), Sovermol® types (Cognis Deutschland GmbH & Co. KG) and Soyol®TM types (USSC Co.).

Monofunctional starter substances which can be employed are alcohols, amines, thiols and carboxylic acids. Monofunctional alcohols which can be used are: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Possible monofunctional amines are: butylamine, tert-butylamine, pentylamine, hexylamine, aniline, aziridine, pyrrolidine, piperidine, morpholine. Monofunctional thiols which can be used are: ethanethiol, 1-propanethiol, 2-propanethiol, 1-butanethiol, 3-methyl-1-butanethiol, 2-butene-1-thiol, thiophenol. Monofunctional carboxylic acids which may be mentioned are: formic acid, acetic acid, propionic acid, butyric acid, fatty acids, such as stearic acid, palmitic acid, oleic acid, linoleic acid, linolenic acid, benzoic acid, acrylic acid.

Polyfunctional alcohols which are suitable as H-functional starter substances are, for example, difunctional alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol, 1,8-octanediol, 1,10-decanediol, 1,12-dodecanediol, bis-(hydroxymethyl)-cyclohexanes (such as, for example, 1,4-bis-(hydroxymethyl) cyclohexane), triethylene glycol, tetraethylene glycol, polyethylene glycols, dipropylene glycol tripropylene glycol, polypropylene glycols, dibutylene glycol and polybutylene glycols); trifunctional alcohols (such as, for example, trimethylolpropane, glycerol, trishydroxyethyl isocyanurate, castor oil); tetrafunctional alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, in particular castor oil), and all modification products of these abovementioned alcohols with various amounts of ε-caprolactone.

The H-functional starter substances can also be chosen from the substance class of polyether polyols, in particular those with a molecular weight Mn in the range of from 100 to 4,000 g/mol. Polyether polyols which are built up from recurring ethylene oxide and propylene oxide units are preferred, preferably with a content of from 35 to 100% of propylene oxide units, particularly preferably with a content of from 50 to 100% of propylene oxide units. These can be random copolymers, gradient copolymers or alternating or block copolymers of ethylene oxide and propylene oxide. Suitable polyether polyols built up from recurring propylene oxide and/or ethylene oxide units are, for example, the Desmophen®, Acclaim®, Arcol®, Baycoll®, Bayfill®, Bayflex®, Baygal®, PET® and polyether polyols of Bayer MaterialScience AG (such as e.g. Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E brands of BASF SE, suitable homo-propylene oxides are, for example, the Pluriol® P brands of BASF SE, and suitable mixed copolymers of ethylene oxide and propylene oxide are, for example, the Pluronic® PE or Pluriol® RPE brands of BASF SE.

The H-functional starter substances can also be chosen from the substance class of polyester polyols, in particular those with a molecular weight Mn in the range of from 200 to 4,500 g/mol. At least difunctional polyesters are employed as polyester polyols. Polyester polyols preferably comprise alternating acid and alcohol units. Acid components which are employed are e.g. succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydride mentioned. Alcohol components which are used are e.g. ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol trimethylolpropane, glycerol, pentaerythritol or mixtures of the alcohols mentioned. If difunctional or polyfunctional polyether polyols are employed as the alcohol component, polyester ether polyols, which can likewise serve as starter substances for the preparation of the polyether carbonate polyols, are obtained. Preferably, polyether polyols with Mn=150 to 2,000 g/mol are employed for the preparation of the polyester-ether polyols.

Polycarbonate diols can furthermore be employed as H-functional starter substances, in particular those with a molecular weight Mn in the range of from 150 to 4,500 g/mol, preferably 500 to 2,500, which are prepared, for example, by reaction of phosgene, dimethyl carbonate, diethyl carbonate or diphenyl carbonate and difunctional alcohols or polyester polyols or polyether polyols. Examples of polycarbonates are to be found e.g. in EP-A 1359177. For example, the Desmophen® C types of Bayer MaterialScience AG, such as e.g. Desmophen® C 1100 or Desmophen® C 2200, can be used as polycarbonate diols.

In a further embodiment of the invention, polyether carbonate polyols can be employed as H-functional starter substances. In particular, polyether carbonate polyols which are obtainable by the process according to the invention described here can be employed. These polyether carbonate polyols employed as H-functional starter substances are prepared beforehand for this in a separate reaction step.

The H-functional starter substances in general have a functionality (i.e. number of H atoms per molecule which are active for the polymerization) of from 1 to 8, preferably of 2 or 3. The H-functional starter substances are employed either individually or as a mixture of at least two H-functional starter substances.

Preferred H-functional starter substances are alcohols of the general formula (IV)

$$HO-(CH_2)_x-OH \qquad (IV)$$

wherein x is a number from 1 to 20, preferably an even number from 2 to 20. Examples of alcohols according to formula (IV) are ethylene glycol, 1,4-butanediol, 1,6-hexanediol, 1,8-octanediol, 1,10-decanediol, 1,12-dodecanediol and dimer acid alcohol. Further preferred H-functional starter substances are neopentyl glycol, trimethylolpropane, glycerol, pentaerythritol, reaction products of the alcohols according to formula (IV) with ε-caprolactone, e.g. reaction products of trimethylolpropane with ε-caprolactone, reaction products of glycerol with ε-caprolactone and reaction products of pentaerythritol with ε-caprolactone. H-functional starter substances which are furthermore preferably employed are diethylene glycol, dipropylene glycol, castor oil, sorbitol and polyether polyols built up from recurring polyalkylene oxide units.

The H-functional starter substances are particularly preferably one or more compounds chosen from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, wherein the polyether polyol is built up from a di- or tri-H-functional starter substance and propylene oxide or a di- or tri-H-functional starter substance, propylene oxide and ethylene oxide. The polyether polyols preferably have a molecular weight Mn in the range of from 62 to 4,500 g/mol and a functionality of from 2 to 3, and in particular a molecular weight Mn in the range of from 62 to 3,000 g/mol and a functionality of from 2 to 3.

The preparation of the polyether carbonate polyols is carried out by catalytic addition of carbon dioxide and alkylene oxides on to H-functional starter substances. In the context of the invention, "H-functional" is understood as meaning the number of H atoms per molecule of the starter substance which are active for the alkoxylation.

DMC catalysts for use in the homopolymerization of alkylene oxides are known in principle from the prior art (see e.g. U.S. Pat. No. 3,404,109, U.S. Pat. No. 3,829,505, U.S. Pat. No. 3,941,849 and U.S. Pat. No. 5,158,922). DMC catalysts, which are described e.g. in U.S. Pat. No. 5,470,813, EP-A 700 949, EP-A 743 093, EP-A 761 708, WO 97/40086, WO 98/16310 and WO 00/47649, have a very high activity and render possible the preparation of polyether carbonate polyols at very low catalyst concentrations, so that in general it is no longer necessary to separate off the catalyst from the finished product. The highly active DMC catalysts described in EP-A 700 949, which, in addition to a double metal cyanide compound (e.g. zinc hexacyanocobaltate(III)) and an organic complexing ligand (e.g. tert-butanol), also contain a polyether with a number-average molecular weight of greater than 500 g/mol, are a typical example.

The DMC catalysts according to the invention are preferably obtained by a procedure in which
(i) in the first step an aqueous solution of a metal salt is reacted with the aqueous solution of a metal cyanide salt in the presence of one or more organic complexing ligands, e.g. of an ether or alcohol,
(ii) wherein in the second step the solid is separated off by known techniques (such as centrifugation or filtration) from the suspension obtained from (i),
(iii) wherein, if appropriate, in a third step the solid which has been isolated is washed with an aqueous solution of an organic complexing ligand (e.g. by resuspending and subsequent renewed isolation by filtration or centrifugation),
(iv) wherein the solid obtained, if appropriate after pulverization, is subsequently dried at temperatures of in general 20-120° C. and under pressures of from in general 0.1 mbar to normal pressure (1013 mbar),
and wherein in the first step or immediately after the precipitation of the double metal cyanide compound (second step), one or more organic complexing ligands, preferably in excess (based on the double metal cyanide compound), and optionally further complexing components are added.

The double metal cyanide compounds contained in the DMC catalysts according to the invention are the reaction products of water-soluble metal salts and water-soluble metal cyanide salts.

For example, an aqueous solution of zinc chloride (preferably in excess, based on the metal cyanide salt, such as, for example, potassium hexacyanocobaltate) and potassium hexacyanocobaltate are mixed and dimethoxyethane (glyme) or tert-butanol (preferably in excess, based on zinc hexacyanocobaltate) is then added to the suspension formed.

Metal salts which are suitable for the preparation of the double metal cyanide compounds preferably have the general formula (V)

$$M(X)_n \qquad (V)$$

wherein
M is chosen from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, preferably M is $Zn^{2+}$, $Fe^{2+}$, $Co^{2+}$ or $Ni^{2+}$,
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
n is 1 if X=sulfate, carbonate or oxalate and
n is 2 if X=halide, hydroxide, carboxylate, cyanate, thiocyanate, isocyanate, isothiocyanate or nitrate,
or suitable metal salts have the general formula (VI)

$$M_r(X)_3 \qquad (VI)$$

wherein
M is chosen from the metal cations $Fe^{3+}$, $Al^{3+}$, $Co^{3+}$ and $Cr^{+}$,
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
r is 2 if X=sulfate, carbonate or oxalate and
r is 1 if X=halide, hydroxide, carboxylate, cyanate, thiocyanate, isocyanate, isothiocyanate or nitrate,
or suitable metal salts have the general formula (VII)

$$M(X)_s \qquad (VII)$$

wherein
M is chosen from the metal cations $Mo^{4+}$, $V^{4+}$ and $W^{4+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 if X=sulfate, carbonate or oxalate and
s is 4 if X=halide, hydroxide, carboxylate, cyanate, thiocyanate, isocyanate, isothiocyanate or nitrate,
or suitable metal salts have the general formula (VIII)

$$M(X)_t \qquad (VIII)$$

wherein
M is chosen from the metal cations $Mo^{6+}$ and $W^{6+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
t is 3 if X=sulfate, carbonate or oxalate and
t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron (II) chloride, iron(III) chloride, cobalt(II) chloride, cobalt(II) thiocyanate, nickel(II) chloride and nickel(II) nitrate. Mixtures of various metal salts can also be employed.

Metal cyanide salts which are suitable for the preparation of the double metal cyanide compounds preferably have the general formula (IX)

$$(Y)_a M'(CN)_b (A)_c \qquad (IX)$$

wherein
M' is chosen from one or more metal cations of the group consisting of Fe(II), Fe(III), Co(II), Co(III), Cr(II), Cr(III), Mn(II), Mn(III), Ir(III), Ni(II), Rh(III), Ru(II), V(IV) and V(V), preferably M' is one or more metal cations of the group consisting of Co(II), Co(III), Fe(II), Fe(III), Cr(III), Ir(III) and Ni(II),
Y is chosen from one or more metal cations of the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is chosen from one or more anions of the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and
a, b and c are integers, wherein the values for a, b and c are chosen such that the metal cyanide salt has electroneutrality; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate (III), calcium hexacyanocobaltate(III) and lithium hexacyanocobaltate(III).

Preferred double metal cyanide compounds which are contained in the DMC catalysts according to the invention are compounds of the general formula (X)

$$M_x[M'_{x'}(CN)_y]_z \qquad (X)$$

wherein M is as defined in formula (V) to (VIII) and
M' is as defined in formula (IX), and
x, x', y and z are integers and are chosen such that the double metal cyanide compound has electroneutrality.
Preferably
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate (III). Further examples of suitable double metal cyanide compounds are to be found e.g. in U.S. Pat. No. 5,158,922 (column 8, lines 29-66). Zinc hexacyanocobaltate(III) is particularly preferably used.

The organic complexing ligands added in the preparation of the DMC catalysts are disclosed, for example, in U.S. Pat. No. 5,158,922 (see in particular column 6, lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, water-soluble, organic compounds with hetero atoms, such as oxygen, nitrogen, phosphorus or sulfur, which can form complexes with the double metal cyanide compound are employed as organic complexing ligands. Preferred organic complexing ligands are alcohols, aldehydes, ketones, ethers, esters, amides, ureas, nitriles, sulfides and mixtures thereof. Particularly preferred organic complexing ligands are aliphatic ethers (such as dimethoxyethane), water-soluble aliphatic alcohols (such as ethanol, isopropanol, n-butanol, iso-butanol, sec-butanol, tert-butanol, 2-methyl-3-buten-2-ol and 2-methyl-3-butyn-2-ol), and compounds which contain both aliphatic or cycloaliphatic ether groups and aliphatic hydroxyl groups (such as e.g. ethylene glycol mono-tert-butyl ether, diethylene glycol mono-tert-butyl ether, tripropylene glycol monomethyl ether and 3-methyl-3-oxetane-methanol). Organic complexing ligands which are most preferred are chosen from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetane-methanol.

One or more complexing component(s) from the compound classes of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(-vinylphenol), poly(acrylic acid-co-styrene), oxazoline polymers, polyalkyleneimines, maleic acid and maleic anhydride copolymers, hydroxyethylcellulose and polyacetals, or of glycidyl ethers, glycosides, carboxylic acid esters of polyfunctional alcohols, bile acids or salts, esters or amides thereof, cyclodextrins, phosphorus compounds, α,β-unsaturated carboxylic acid esters or ionic surface- or interface-active compounds are optionally employed in the preparation of the DMC catalysts according to the invention.

Preferably, in the first step in the preparation of the DMC catalysts according to the invention, the aqueous solutions of the metal salt (e.g. zinc chloride), employed in a stoichiometric excess (at least 50 mol %), based on the metal cyanide salt (that is to say at least a molar ratio of metal salt to metal cyanide salt of 2.25 to 1.00) and of the metal cyanide salt (e.g. potassium hexacyanocobaltate) are reacted in the presence of the organic complexing ligands (e.g. tert-butanol), a suspension which contains the double metal cyanide compound (e.g. zinc hexacyanocobaltate), water, excess metal salt and the organic complexing ligand being formed.

In this context, the organic complexing ligand can be present in the aqueous solution of the metal salt and/or of the metal cyanide salt, or it is added directly to the suspension obtained after precipitation of the double metal cyanide compound. It has proved to be advantageous to mix the aqueous solutions of the metal salt and of the metal cyanide salt and the organic complexing ligand with vigorous stirring. The suspension formed in the first step is then optionally treated with a further complexing component. In this context, the complexing component is preferably employed in a mixture with water and organic complexing ligand. A preferred method for carrying out the first step (i.e. the preparation of the suspension) is carried out employing a mixing nozzle, particularly preferably employing a jet disperser as described in WO-A 01/39883.

In the second step the solid (i.e. the precursor of the catalyst according to the invention) is isolated from the suspension by known techniques, such as centrifugation or filtration.

In a preferred embodiment variant, in a third process step the solid which has been isolated is subsequently washed with an aqueous solution of the organic complexing ligand (e.g. by resuspending and subsequent renewed isolation by filtration or centrifugation). In this manner, for example, water-soluble by-products, such as potassium chloride, can be removed from the catalyst according to the invention. Preferably, the amount of organic complexing ligand in the aqueous washing solution is between 40 and 80 wt. %, based on the total solution.

In the third step, further complexing component is optionally added to the aqueous washing solution, preferably in the range of between 0.5 and 5 wt. %, based on the total solution.

It is moreover advantageous for the solid which has been isolated to be washed more than once. Preferably, washing is carried out in a first washing step (iii-1) with an aqueous solution of the unsaturated alcohol (e.g. by resuspending and subsequent renewed isolation by filtration or centrifugation), in order to remove, for example, water-soluble by-products, such as potassium chloride, from the catalyst according to the invention in this manner. Particularly preferably, the amount of unsaturated alcohol in the aqueous washing solution is between 40 and 80 wt. %, based on the total solution of the first washing step. In the further washing steps (iii-2), either the first washing step is repeated once or several times, preferably once to three times, or, preferably, a non-aqueous solution, such as e.g. a mixture or solution of unsaturated alcohol and further complexing component (preferably in the range between 0.5 and 5 wt. %, based on the total amount of the washing solution of step (iii-2)), is employed as the washing solution and the solid is washed with this once or several times, preferably once to three times.

The solid which has been isolated and optionally washed is then dried, optionally after pulverization, at temperatures of in general 20-100° C. and under pressures of from in general 0.1 mbar to normal pressure (1013 mbar).

A preferred method for isolating the DMC catalysts according to the invention from the suspension by filtration, washing of the filter cake and drying is described in WO-A 01/80994.

The polyether carbonate polyols obtainable by the process according to the invention have a low content of by-products and can be processed without problems, in particular by reaction with di- and/or polyisocyanates, to give polyurethanes, in particular flexible polyurethane foams. For polyurethane uses, polyether carbonate polyols which are based on an H-functional starter substance which has a functionality of at least 2 are preferably employed. The polyether carbonate polyols obtainable by the process according to the invention can furthermore be used in uses such as detergent and cleaning agent formulations, drilling liquids, fuel additives, ionic and nonionic surfactants, lubricants, process chemicals for papermaking or textile production or cosmetic formulations. It is known to the person skilled in the art that, depending on the particular field of use, the polyether carbonate polyols to be used must comply with certain substance properties, such as, for example, molecular weight, viscosity, functionality and/or hydroxyl number.

EXAMPLES

H-functional starter substances employed (starters):
PET-1 Polypropylene glycol with an OH number of 112 mg of KOH/g The DMC catalyst was prepared in accordance with Example 6 of WO-A 01/80994.

The heterocumulenes employed were:
DCC=Dicyclohexylcarbodiimide
TSI=Tosyl isocyanate In the copolymerization, in addition to the cyclic propylene carbonate, the polyether carbonate polyol which on the one hand contains the polycarbonate units shown in formula (XIa)

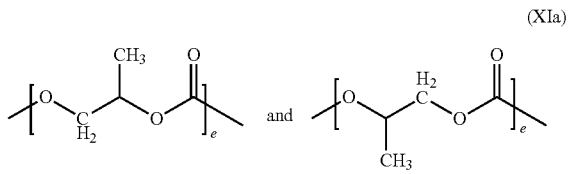

(XIa)

and on the other hand contains the polyether units shown in formula (XIb) resulted.

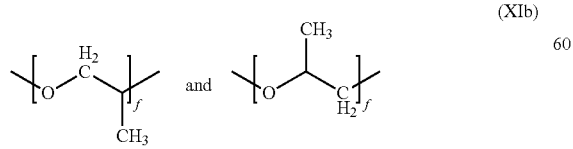

(XIb)

The reaction mixture was characterized by $^1$H-NMR spectroscopy and gel permeation chromatography:

The weight- and number-average molecular weight of the polymers formed were determined by means of gel permeation chromatography (GPC). The procedure was in accordance with DIN 55672-1: "Gel permeation chromatography, Part 1—Tetrahydrofuran as the eluting agent" (SECurity GPC System from PSS Polymer Service, flow rate 1.0 ml/min; columns. 2×PSS SDV linear M, 8×300 mm, 5 µm; RID detector). Polystyrene samples of known molecular weight were used here for the calibration.

The OH number (hydroxyl number) was determined in accordance with DIN 53240-2, N-methylpyrrolidone being used as the solvent, however, instead of THF/methylene chloride. Titration was carried out with 0.5 molar ethanolic KOH solution (end point detection by means of potentiometry). Castor oil with an OH number specified by certificate functioned as the test substance. The unit stated in "mg/g" relates to mg[KOH]/g[polyether carbonate polyol].

The ratio of the amount of cyclic propylene carbonate to polyether carbonate polyol (selectivity, Op and the molar ratio of carbonate groups to ether groups in the polyether carbonate polyol (ratio elf) and the amount of propylene oxide reacted (C in mol %) were determined by means of $^1$H-NMR spectroscopy. The sample was in each case dissolved in deuterated chloroform and measured on a Bruker spectrometer (AV400, 400 MHz, pulse programme zg30, waiting time d1:1 s, 16 scan). The relevant resonances in the $^1$H-NMR spectrum (based on TMS=0 ppm) are as follows and were used for the integration:

I1: 1.11-1.17: Methyl group of the polyether units, area of the resonance corresponds to three H atoms
I2: 1.25-1.32: Methyl group of the polycarbonate units, area of the resonance corresponds to three H atoms
I3: 1.45-1.49: Methyl group of the cyclic carbonate, area of the resonance corresponds to three H atoms
I4: 2.95-2.99: CH group of the free, unreacted propylene oxide, area of the resonance corresponds to one H atom Taking into account the relative intensities, the values were calculated as follows:

Molar ratio of the amount of cyclic propylene carbonate to polymer (selectivity, c/1):

$$c/1 = I3/I2 \qquad (XII)$$

Molar ratio of carbonate groups to ether groups in the polymer (e/f):

$$e/f = I2/I1 \qquad (XIII)$$

The molar content of propylene oxide reacted (C in mol %), based on the sum of the amount of propylene oxide employed in the activation and the copolymerization, calculated according to the formula:

$$C = [((I1/3)+(I2/3)+(I3/3))/((I1/3)+(I2/3)+(I3/3)+I4)]*100\% \qquad (XIV)$$

was between 97.8 and >99.9% in the examples.

Example 1

Polymerization of Propylene Oxide and CO$_2$ Using a TSI-Activated DMC Catalyst

A mixture of DMC catalyst (8 mg), TSI (0.5 ml) and PET-1 (3 g) was initially introduced into a 300 ml pressure reactor and the mixture was stirred (500 rpm) for 30 min at 130° C. under a slight vacuum (500 mbar) and a gentle stream of Ar [step (α)]. After applying a pressure of 15 bar of CO$_2$, 7.5 g of propylene oxide were metered in with the aid of an HPLC pump (1 ml/min). The pressure in the reactor was subsequently kept at 15 bar by topping up with $CO_2$. The reaction mixture was stirred (500 rpm) at 130° C. for 30 min [step (β)]. After cooling to 100° C., a further 32.5 g of propylene oxide were metered in via an HPLC pump (1 ml/min), while stirring. The mixture was then stirred at 100° C. for a further 2.5 h [step (γ)]. The reaction was ended by cooling in an ice-bath, the increased pressure was let down and the resulting product was analyzed.

The selectivity c/l was 0.03.

The molar ratio of carbonate groups to ether groups e/f was 49/51.

Example 2

Polymerization of Propylene Oxide and $CO_2$ Using a DCC-Activated DMC Catalyst A mixture of DMC catalyst (8 mg), DCC (9.2 mg) and PET-1 (3 g) was initially introduced into a 300 ml pressure reactor and the mixture was stirred (500 rpm) for 30 min at 130° C. under a slight vacuum (500 mbar) and a gentle stream of Ar [step (α)]. After applying a pressure of 15 bar of $CO_2$, 7.5 g of propylene oxide were metered in with the aid of an HPLC pump (1 ml/min). The pressure in the reactor was subsequently kept at 15 bar by topping up with $CO_2$. The reaction mixture was stirred (500 rpm) at 130° C. for 30 min [step (β)]. After cooling to 100° C., a further 32.5 g of propylene oxide were metered in via an HPLC pump (1 ml/min), while stirring. The mixture was then stirred at 100° C. for a further 2.5 h [step (γ)]. The reaction was ended by cooling in an ice-bath, the increased pressure was let down and the resulting product was analyzed.

The selectivity c/l was 0.05.

The molar ratio of carbonate groups to ether groups e/f was 33/67.

Comparison Example 3

Polymerization of Propylene Oxide and $CO_2$ Using a DMC Catalyst Activated without Addition of Heterocumulenes A mixture of DMC catalyst (8 mg) and PET-1 (3 g) was initially introduced into a 300 ml pressure reactor and the mixture was stirred (500 rpm) for 30 min at 130° C. under a slight vacuum (500 mbar) and a gentle stream of Ar [step (α)]. After applying a pressure of 15 bar of $CO_2$, 7.5 g of propylene oxide were metered in with the aid of an HPLC pump (1 ml/min). The pressure in the reactor was subsequently kept at 15 bar by topping up with $CO_2$. The reaction mixture was stirred (500 rpm) at 130° C. for 30 min [step (β)]. After cooling to 100° C., a further 32.5 g of propylene oxide were metered in via an HPLC pump (1 ml/min), while stirring. The mixture was then stirred at 100° C. for a further 2.5 h [step (γ)]. The reaction was ended by cooling in an ice-bath, the increased pressure was let down and the resulting product was analyzed.

The selectivity c/l was 0.05.

The molar ratio of carbonate groups to ether groups e/f was 27/73.

A comparison of Examples 1 and 2 with Comparison Example 3 (Table 1) shows that the presence of heterocumulenes in the first activation stage leads to a higher incorporation of $CO_2$ and a tendency towards a lower content of cyclic carbonates.

TABLE 1

Results of Examples 1 to 3

| Example | Heterocumulene | n(Heterocumulene) [mmol] | e/f | c/l | $M_n$ [g/mol] |
|---|---|---|---|---|---|
| 1 | TSI | 3.27 | 49/51 | 0.03 | 5,700 |
| 2 | DCC | 0.05 | 33/67 | 0.05 | 7,100 |
| 3 (comp.) | — | — | 27/37 | 0.05 | 16,500 | n(Heterocumulene): substance amount of heterocumulene
$M_n$: number-average molecular weight
comp.: comparison example

Examples 4 to 7

Polymerization of Propylene Oxide and $CO_2$ Using a TSI-Activated DMC Catalyst with Variation of the TSI Concentration A mixture of DMC catalyst (8 mg), TSI in the amount stated in each case in Table 2 ($n_{TSI}$) and PET-1 (3 g) was initially introduced into a 300 ml pressure reactor and the mixture was stirred (500 rpm) for 30 min at 130° C. under a slight vacuum (500 mbar) and a gentle stream of Ar [step (α)]. After applying a pressure of 15 bar of $CO_2$, 7.5 g of propylene oxide were metered in with the aid of an HPLC pump (1 ml/min). The pressure in the reactor was subsequently kept at 15 bar by topping up with $CO_2$. The reaction mixture was stirred (500 rpm) at 130° C. for 30 min [step (β)]. After cooling to 100° C., a further 32.5 g of propylene oxide were metered in via an HPLC pump (1 ml/min), while stirring. The mixture was then stirred at 100° C. for a further 2.5 h [step (γ)]. The reaction was ended by cooling in an ice-bath, the increased pressure was let down and the resulting product was analyzed. The results of the characterization of the product are summarized in the following Table 2.

TABLE 2

Variation in the TSI concentration

| Example | n(TSI) [mmol] | e/f | c/l | $M_n$ [g/mol] |
|---|---|---|---|---|
| 4 | 0.33 | 25/75 | 0.05 | 9,800 |
| 5 | 0.80 | 41/59 | 0.05 | 9,400 |
| 6 | 1.31 | 32/68 | 0.03 | 3,900 |
| 7 | 2.30 | 33/67 | 0.09 | 8,300 |
| 1 | 3.27 | 49/51 | 0.03 | 5,700 | n(TSI): substance amount of TSI
$M_n$: number-average molecular weight

Examples 8 to 10

Polymerization of Propylene Oxide and $CO_2$ Using a DCC-Activated DMC Catalyst with Variation of the DCC Concentration A mixture of DMC catalyst (8 mg), DCC and PET-1 (3 g) was initially introduced into a 300 ml pressure reactor and the mixture was stirred (500 rpm) for 30 min at 130° C. under a slight vacuum (500 mbar) and a gentle stream of Ar [step (α)]. After applying a pressure of 15 bar of $CO_2$, 7.5 g of propylene oxide were metered in with the aid of an HPLC pump (1 ml/min). The pressure in the reactor was subsequently kept at 15 bar by topping up with $CO_2$. The reaction mixture was stirred (500 rpm) at 130° C. for 30 min [step (β)]. After cooling to 100° C., a further 32.5 g of propylene oxide were metered in via an HPLC pump (1 ml/min), while stirring. The mixture was then stirred at 100° C. for a further 2.5 h [step (γ)]. The reaction was ended by cooling in an ice-bath, the increased pressure was let down and the resulting product was analyzed. The results of the characterization of the product are summarized in the following Table 3.

TABLE 3

Variation in the DCC concentration

| Example | n(DCC) [mmol] | e/f | c/l | $M_n$ [g/mol] |
|---|---|---|---|---|
| 2 | 0.05 | 33/67 | 0.05 | 7,100 |
| 8 | 1.69 | 37/63 | 0.03 | 12,100 |
| 9 | 3.31 | 26/74 | 0.03 | 13,500 |
| 10 | 6.55 | 29/71 | 0.02 | 9,000 | n(DCC): substance amount of DCC
$M_n$: number-average molecular weight

Examples 11 to 18

Polymerization of Propylene Oxide and $CO_2$ Using an Activated DMC Catalyst with Variation of the Chain Length of the Product A mixture of DMC catalyst (8 mg), where appropriate the heterocumulene of the type and amount stated in Table 3 and PET-1 (3 g) was initially introduced into a 300 ml pressure reactor and the mixture was stirred (500 rpm) for 30 min at 130° C. under a slight vacuum (500 mbar) and a gentle stream of Ar [step (α)]. After applying a pressure of 15 bar of $CO_2$, 15 wt. % of the amount of propylene oxide stated in each case in Table 3 were metered in with the aid of an HPLC pump (1 ml/min). The pressure in the reactor was subsequently kept at 15 bar by topping up with $CO_2$. The reaction mixture was stirred (500 rpm) at 130° C. for 30 min [step (β)]. After cooling to 100° C., the remaining amount of 85 wt. % of propylene oxide were metered in via an HPLC pump (1 ml/min), while stirring. The mixture was then stirred at 100° C. for a further 2.5 h [step (γ)]. The reaction was ended by cooling in an ice-bath, the increased pressure was let down and the resulting product was analyzed. The results of the characterization of the product are summarized in the following Table 4.

TABLE 4

Variation of the molecular weight (of the chain length) of the resulting polyether carbonate polyol

| Example | Hetero-cumulene | n(Hetero-cumulene) [mmol] | Amount of propylene oxide [g] | e/f | c/l | $M_n$ (g/mol) |
|---|---|---|---|---|---|---|
| 11 (comp.) | — | — | 4.75 | 5/95 | 0.12 | 2,700 |
| 12 (comp.) | — | — | 9.50 | 8/92 | 0.15 | 5,100 |
| 13 (comp.) | — | — | 20.00 | 7/93 | 0.10 | 8,500 |
| 3 (comp.) | — | — | 40.00 | 27/73 | 0.05 | 16,500 |
| 14 (comp.) | — | — | 80.00 | 28/72 | 0.08 | 22,200 |
| 15 | TSI | 3.27 | 4.75 | 35/65 | 0.09 | 3,250 |
| 16 | DCC | 1.69 | 9.50 | 35/65 | 0.07 | 3,400 |
| 17 | DCC | 1.69 | 20.00 | 34/66 | 0.06 | 6,900 |
| 8 | DCC | 1.69 | 40.00 | 37/63 | 0.03 | 17,300 |
| 18 | DCC | 1.69 | 80.00 | 32/68 | 0.04 | 25,300 | n(Heterocumulene): substance amount of heterocumulene
$M_n$: number-average molecular weight
comp.: comparison example

The invention claimed is:

1. A process for the preparation of a polyether carbonate polyol from one or more H-functional starter substances, one or more alkylene oxides and carbon dioxide in the presence of a double metal cyanide (DMC) catalyst, comprising
   (α) mixing, under an inert gas atmosphere, under an atmosphere of an inert gas/carbon dioxide mixture or under a pure carbon dioxide atmosphere, at temperatures of from 90 to 150° C., the DMC catalyst with a heterocumulene and one or more H-functional starter substance,
   (β) adding alkylene oxide at temperatures of from 100 to 150° C. to the mixture from step (α) under an inert gas atmosphere, under an atmosphere of an inert gas/carbon dioxide mixture or under a pure carbon dioxide atmosphere, and
   (γ) metering continuously one or more alkylene oxides and carbon dioxide into the mixture resulting from step (β).

2. The process according to claim 1, wherein step (γ) is carried out at 90 to 130° C.

3. A process for activation of a DMC catalyst, comprising
   (α) mixing, under an inert gas atmosphere, under an atmosphere of an inert gas/carbon dioxide mixture or under a pure carbon dioxide atmosphere, the DMC catalyst with a heterocumulene and an H-functional starter substance, and subsequently
   (β) adding alkylene oxide at temperatures of from 90 to 150° C. to the mixture from step (α) under an inert gas atmosphere, under an atmosphere of an inert gas/carbon dioxide mixture or under a pure carbon dioxide atmosphere.

4. The process according to claim 1, wherein in step (α)
   (α1) the H-functional starter substance or a mixture of at least two H-functional starter substances is initially introduced into a reaction vessel and
   (α2) the temperature of the starter substance or of the mixture of at least two H-functional starter substances is brought to 50 to 200° C. and/or the pressure in the reactor is adjusted to less than 500 mbar, and wherein the DMC catalyst and heterocumulene are added to the H-functional starter substance or the mixture of at least two H-functional starter substances in step (α1) or subsequently during step (α2).

5. The process according to claim 1, wherein the part amount of one or more alkylene oxides in step (β) is 0.1 to 25.0 wt. % based on the amount of H-functional starter substance in step (α).

6. The process according to claim 1, wherein the heterocumulene comprises at least one functional group selected from the group consisting of isocyanate group, isothiocyanate group, carbodiimide group, ketene group, and thioketene group compounds containing at least one S=C=C< group).

7. The process according to claim 1, wherein the heterocumulene comprises a compound of the formula (II)

$$R^1-(-X-N=C=O)_n \qquad (II)$$

wherein
R$^1$ is an n-valent aliphatic, aromatic or araliphatic radical having 1 to 36 carbon atoms,
n is a natural number from 1 to 6 and
X is a single bond, an —SO$_2$— or a —CO— group.

8. The process according to claim 1, wherein the heterocumulene comprises a compound of the formulae (IIIa) and (IIIb)

$$R^2-N=C=N-R^3 \qquad (IIIa)$$

$$OCN-R^4-[-N=C=N-R^4-]_m-NCO \qquad (IIIb)$$

wherein
R$^2$ and R$^3$ are a C$_1$ to C$_{22}$ alkyl, a C$_6$-C$_{18}$ aryl or a C$_7$-C$_{22}$ aralkyl radical,
R$^4$ is a divalent C$_6$-C$_{36}$ aliphatic, aromatic or araliphatic radical and
m is a natural number from 3 to 300.

9. The process according to claim 1, wherein the heterocumulene comprises at least one compound selected from the group consisting of tosyl isocyanate, benzoyl isocyanate, acetyl isocyanate, carbonyl-diisocyanate, sulfonyl-diisocyanate, benzenesulfonyl isocyanate, methansulfonyl-diisocyanate, o-, m- and p-phthaloyl-diisocyanate, 4,4',4''-triisocyanatophenylmethane, 4,4'-methylene-diisocyanate, 2,4'-methylene-diisocyanate, 2,2'-methylene-diisocyanate, 2,4-toluylene-diisocyanate, 2,6-toluylene-diisocyanate, m- and p-phenylene-diisocyanate, diphenyl-diisocyanate, 3,3'-dimethyl-4,4'-diisocyanatodiphenyl, 3,4'-diisocyanatodiphenyl ether, 4,4'-diisocyanatodiphenyl ether, m- and p-bisisocyanatomethylbenzene, 1,3- and 1,4-bisisocyanatomethylcyclohexane, 1,3-bis-(1-isocyanato-1-methylethyl)benzene, 1,6-hexamethylene-diisocyanate (HDI), 2,2,4-trimethyl-1,6-hexamethylene-diisocyanate, isophorone-diisocyanate (IPDI), m-tetramethylxylene-diisocyanate (m-TMXDI), bisisocyanatomethylnorbornane, phenyl isocyanate, butyl isocyanate and methyl isocyanate, dicyclohexylcarbodiimide, di-p-toluylcarbodiimide, di-tert-butylcarbodiimide, diisopropylcarbodiimide, tert-butylethylcarbodiimide, and 3-dimethylaminopropylethylcarbodiimide.

10. The process according to claim 1, wherein the one or more H-functional starter substance is selected from at least one of the group consisting of alcohols, amines, thiols, amino alcohols, thioalcohols, hydroxy esters, polyether polyols, polyester polyols, polyester ether polyols, polycarbonate polyols, polyether carbonate polyols, polyethyleneimines, polyether-amines, polytetrahydrofurans, polyether thiols, polyacrylate polyols, castor oil, the mono- or diglyceride of ricinoleic acid, monoglycerides of fatty acids, and chemically modified mono-, di- and/or triglycerides of fatty acids, and C$_1$-C$_{24}$-alkyl fatty acid esters which contain on average at least 2 OH groups per molecule.

11. The process according to claim 1, wherein the one or more H-functional starter substance is selected from at least one of the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, di- and trifunctional polyether polyols, wherein the polyether polyol is built up from a di- or tri-H-functional starter substance and propylene oxide or a di- or tri-H-functional starter substance, propylene oxide and ethylene oxide and the polyether polyols have a molecular weight M$_n$ in the range of from 62 to 4,500 g/mol and a functionality of from 2 to 3.

12. The process according to claim 1, wherein the DMC catalyst comprises at least one double cyanide compound selected from the group consisting of zinc hexacyanocobaltate(III), zinc hexacyanoiridate(III), zinc hexacyanoferrate (III), and cobalt(II) hexacyanocobaltate(III).

13. The process according to claim 1, wherein the DMC catalyst comprises at least one organic complexing ligand selected from the group consisting of aliphatic ethers, ethanol, isopropanol, n-butanol, iso-butanol, sec-butanol, tert-butanol, 2-methyl-3-buten-2-ol, 2-methyl-3-butyn-2-ol, ethylene glycol mono-tert-butyl ether, diethylene glycol mono-tert-butyl ether, tripropylene glycol monomethyl ether, and 3-methyl-3-oxetane-methanol.

14. The process according to claim 1, wherein the process is carried out in a tube reactor, a stirred tank or a loop reactor.

15. The Process according to claim 1, wherein the process is carried out in a stirred tank and wherein in step (γ) the one or more H-functional starter substances are metered continuously into a stirred tank during the reaction.

* * * * *